US011662001B2

(12) United States Patent
Leipprandt et al.

(10) Patent No.: US 11,662,001 B2
(45) Date of Patent: May 30, 2023

(54) DUAL DRIVE REDUNDANT LOAD TRANSMISSION DEVICE AND PROCESS

(71) Applicant: CEF Industries, LLC, Addison, IL (US)

(72) Inventors: Douglas Leipprandt, Addison, IL (US); Spence Stockbridge, Addison, IL (US); Matthew Burzawa, Addison, IL (US)

(73) Assignee: CEF Industries, LLC, Addison, IL (US)

( * ) Notice: Subject to any disclaimer, the term of this patent is extended or adjusted under 35 U.S.C. 154(b) by 0 days.

(21) Appl. No.: 17/558,487

(22) Filed: Dec. 21, 2021

(65) Prior Publication Data

US 2022/0235853 A1 Jul. 28, 2022

Related U.S. Application Data

(60) Provisional application No. 63/128,336, filed on Dec. 21, 2020.

(51) Int. Cl.
*F16H 19/08* (2006.01)
*B64C 25/18* (2006.01)

(52) U.S. Cl.
CPC ............. *F16H 19/08* (2013.01); *B64C 25/18* (2013.01)

(58) Field of Classification Search
CPC ................................. F16H 19/08; F16H 25/18
USPC ......................................................... 74/89.28
See application file for complete search history.

(56) References Cited

U.S. PATENT DOCUMENTS

| 4,598,598 | A | * | 7/1986 | Kring | .......................... B25J 9/10 901/29 |
| 4,627,300 | A | * | 12/1986 | Stoy | ........................ B21B 31/18 74/425 |
| 4,637,272 | A | | 1/1987 | Teske et al. | |
| 4,858,490 | A | | 8/1989 | Grant | |
| 5,028,828 | A | | 7/1991 | Felkai et al. | |
| 6,082,207 | A | * | 7/2000 | Babinski | ............. F16H 25/2204 211/1.51 |
| 6,405,782 | B1 | * | 6/2002 | Cheng | ..................... E06B 9/368 49/362 |
| 6,513,398 | B1 | * | 2/2003 | Finkemeyer | ............. H02K 7/06 74/427 |

(Continued)

OTHER PUBLICATIONS

International Patent Application No. PCT/US2021/064728; Int'l Search Report and the Written Opinion; dated Mar. 16, 2022; 8 pages.

*Primary Examiner* — David M Fenstermacher
(74) *Attorney, Agent, or Firm* — BakerHostetler

(57) ABSTRACT

A redundant load transmission includes an input shaft configured to receive a rotational torque from a primary drive, an output shaft configured to transmit the rotational torque to an actuator, and a coupling assembly configured to connect the input shaft to the output shaft to transmit the rotational torque. The input shaft is configured to receive the rotational torque from the primary drive and transmit the rotational torque through the coupling assembly when the coupling assembly is in a primary drive configuration. The coupling assembly is configured to be disconnected from the input shaft and transmit a rotational torque to the output shaft from a secondary drive when the coupling assembly is in a secondary drive configuration.

17 Claims, 4 Drawing Sheets

(56) References Cited

U.S. PATENT DOCUMENTS

| | | | |
|---|---|---|---|
| 8,230,750 B2* | 7/2012 | Flatt | B64C 13/341 |
| | | | 244/99.2 |
| 2005/0229729 A1 | 10/2005 | Zordan | |
| 2010/0012779 A1 | 1/2010 | Collins | |
| 2013/0283948 A1* | 10/2013 | Chen | A61H 7/007 |
| | | | 74/89.28 |
| 2015/0204426 A1* | 7/2015 | Wu | F16H 25/20 |
| | | | 74/89.28 |
| 2015/0342809 A1* | 12/2015 | Doppler | F16H 55/06 |
| | | | 5/611 |

* cited by examiner

DUAL DRIVE REDUNDANT LOAD TRANSMISSION DEVICE AND PROCESS

CROSS-REFERENCE TO RELATED APPLICATIONS

This application claims the benefit of U.S. Provisional Application No. 63/128,336 filed on Dec. 21, 2020, which is hereby incorporated by reference in its entirety for all purposes as if fully set forth herein.

FIELD OF THE DISCLOSURE

The disclosure relates to a transmission for an actuator. More particularly, the disclosure relates to a redundant load transmission device and process for an actuator. The disclosure further relates to a redundant drive system and process for an actuator.

BACKGROUND OF THE DISCLOSURE

Electromechanical actuators are well known in the automotive industry, aviation industry, and other industries. Actuators typically only have a single drive system and may not be able actuate properly during a mechanical failure. Actuator failure in critical applications is very undesirable and may present a great safety concern as well as the possibility of substantial equipment damage.

For example, one application for electromechanical actuators is in landing gear systems on aircraft. Aircraft have landing gear systems that must be reliably deployed from a stowed position to an extended position during landing. In some arrangements, the landing gear is deployed through rotation about a pivot in response to operation of an actuator such as an electromechanical linear actuator.

Landing gear actuators typically will not be able to deploy in the event of a mechanical failure within the actuator. In particular, many landing gear actuators only have a single drive system and may not be able deploy properly during a mechanical failure of the single drive system. For example, a single drive system may seize during failure preventing further movement of the transmission and the actuator. Landing gear actuator failure is very undesirable and may present a great safety concern as well as the possibility of substantial aircraft damage.

Accordingly, it would be desirable to have an actuator with a redundant system in order to overcome mechanical failures and increase safety and limit equipment damage.

SUMMARY OF THE DISCLOSURE

The foregoing needs are met, to a great extent, by the disclosure, which describes a redundant load transmission for an actuator. In one aspect, the actuator may be configured to actuate and extend landing gear for an aircraft. In one aspect, the actuator may be configured to actuate a flight surface for an aircraft. In one aspect the actuator may be configured to actuate a flight surface for an aircraft including one of an aileron, an elevator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, control horn, rudder trim, aileron trim, and the like. In one aspect, the actuator may be configured to actuate a component for an aircraft such as thrust reversers, weapons systems, in-flight fueling systems, tail hook arrest systems, and/or the like.

One aspect includes a redundant load transmission includes: an input shaft configured to receive a rotational torque from a primary drive; an output shaft configured to transmit the rotational torque to an actuator; a coupling assembly configured to connect the input shaft to the output shaft to transmit the rotational torque; the input shaft configured to receive the rotational torque from the primary drive and transmit the rotational torque through the coupling assembly when the coupling assembly is in a primary drive configuration; and the coupling assembly being configured to be disconnected from the input shaft and transmit a rotational torque to the output shaft from a secondary drive when the coupling assembly is in a secondary drive configuration.

In one aspect a redundant load transmission includes an input shaft configured to receive a rotational torque from a primary drive; an output shaft configured to transmit the rotational torque to an actuator; a coupling assembly configured to connect the input shaft to the output shaft to transmit the rotational torque; the input shaft configured to receive the rotational torque from the primary drive and transmit the rotational torque through the coupling assembly when the coupling assembly is in a primary drive configuration; and the coupling assembly being configured to be disconnected from the input shaft and transmit a rotational torque to the output shaft from a secondary drive when the coupling assembly is in a secondary drive configuration.

In one aspect, the redundant load transmission may further include an emergency controller. The emergency controller may be implemented by hardware as described herein. In this aspect, the redundant load transmission may be activated by applying power to the emergency controller. In one aspect, the redundant load transmission may be configured to operate in a normal mode and further configured to implement health monitoring. The health monitoring may be implemented by hardware as described herein.

In one aspect, the redundant load transmission may further include a controller in electrical communication with the primary drive and the secondary drive; and a sensor configured to send a signal to the controller when the primary drive configuration has failed. The controller may be configured to switch the redundant load transmission from the primary drive configuration to the secondary drive configuration in response to receiving the signal from the sensor. A landing gear system may include the redundant load transmission described above, wherein the actuator may include a landing gear actuator configured to extend and retract landing gear.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
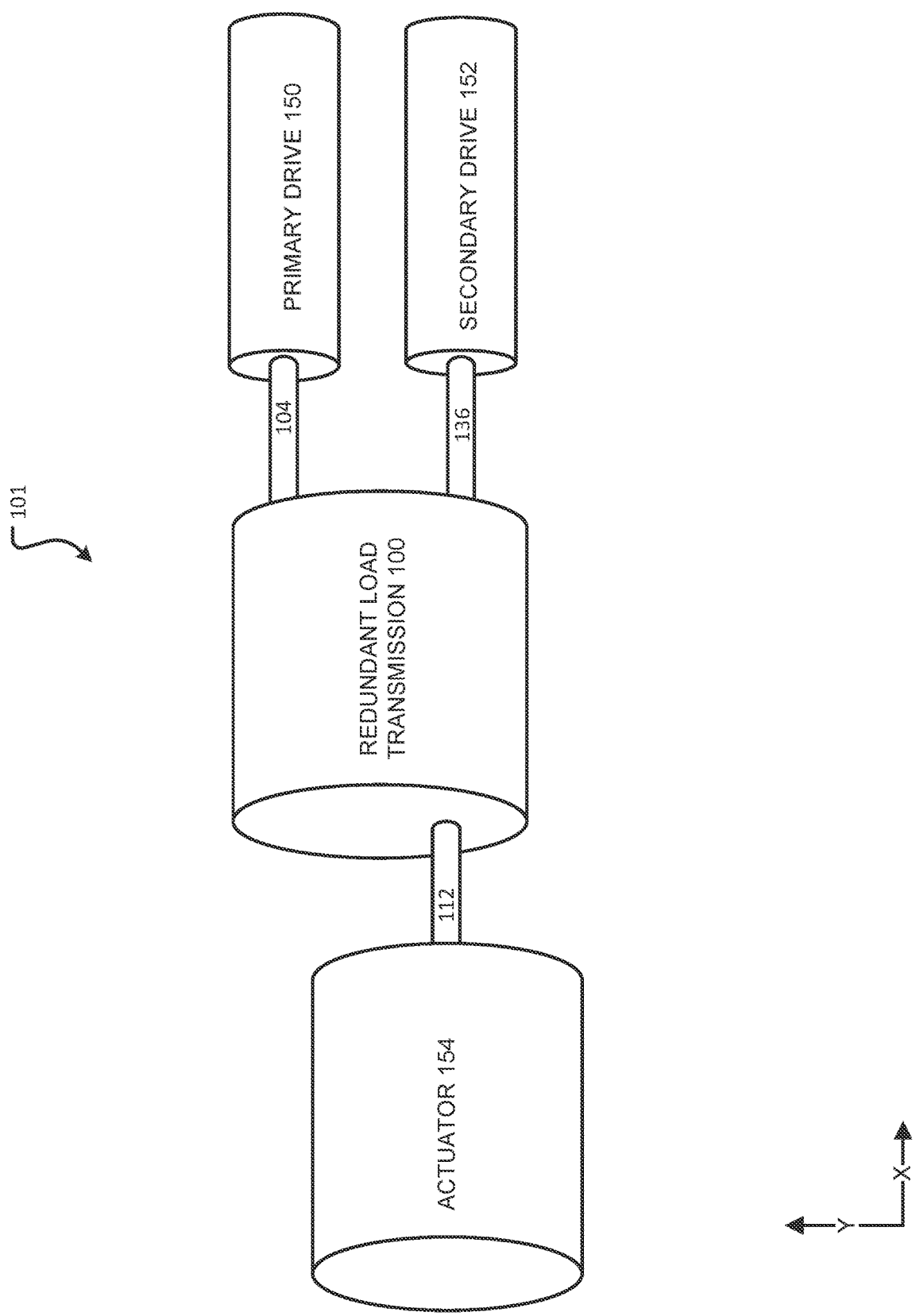
FIG. 1 illustrates a schematic of the actuator system according to an aspect of the disclosure.

The disclosure will now be described with reference to the drawing figures, in which like reference numerals refer to like parts throughout. Various aspects of the disclosure advantageously provide a transmission that provides redundant drives for an actuator.

FIG. 1 illustrates a schematic of the actuator system according to an aspect of the disclosure.

The actuator system 101 may include a redundant load transmission 100 that may be connected to a primary drive 150 for driving an actuator 154 in a primary drive configuration. In this regard, rotation of the primary drive 150 may generate a torque that is applied to the redundant load transmission 100 through an input shaft 104. The redundant load transmission 100 may subsequently output a torque to the actuator 154 for operation of the actuator 154 through an output shaft 112.

The redundant load transmission 100 may be configured to disconnect from the primary drive 150 when the primary drive 150 fails. In one aspect, the disconnection of the primary drive 150 from the redundant load transmission 100 may be to ensure continued operation of the redundant load transmission 100 and the actuator 154. In this regard, failure of the primary drive 150 may include failures that prevent further rotation of a driveshaft or other components of the primary drive 150. For example, the primary drive 150 may seize. This type of failure would result in the inability for the transmission to rotate and the actuator 154 to actuate.

Accordingly, disconnection of the primary drive 150 from the redundant load transmission 100 may prevent the redundant load transmission 100 from being rotationally locked based on a failure of the primary drive 150 to rotate. Thus, the redundant load transmission 100 may be disconnected from the primary drive motor and thereafter, the redundant load transmission 100 may be driven by a secondary drive 152 through an input shaft 136 that subsequently drives the actuator 154 through the output shaft 112.

The actuator 154 may be configured to actuate any type of automotive, aircraft, and/or the like type components. In one aspect, the actuator 154 may be configured to actuate and extend landing gear for an aircraft. In one aspect, the actuator 154 may be configured to actuate a flight surface for an aircraft. In one aspect the actuator 154 may be configured to actuate a flight surface for an aircraft including one of an aileron, an elevator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, control horn, rudder trim, aileron trim, and the like. In one aspect, the actuator 154 may be configured to actuate a component for an aircraft such as thrust reversers, weapons systems, in-flight fueling systems, tail hook arrest systems, and the like.

Figure 2A:
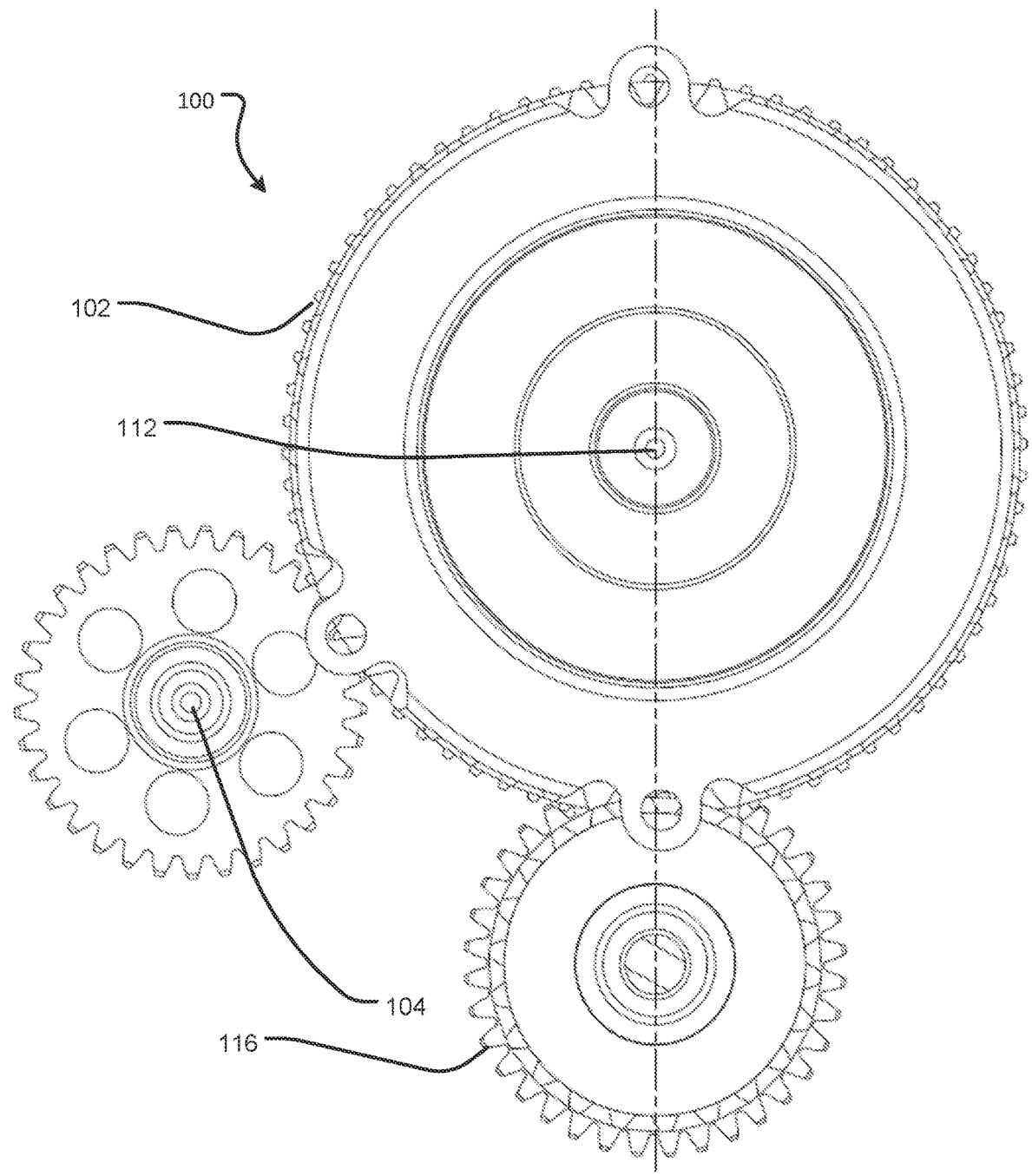
FIG. 2A illustrates an end view of a redundant load transmission according to an aspect of the disclosure.

FIG. 2A illustrates an end view of a redundant load transmission according to an aspect of the disclosure.

Figure 2B:
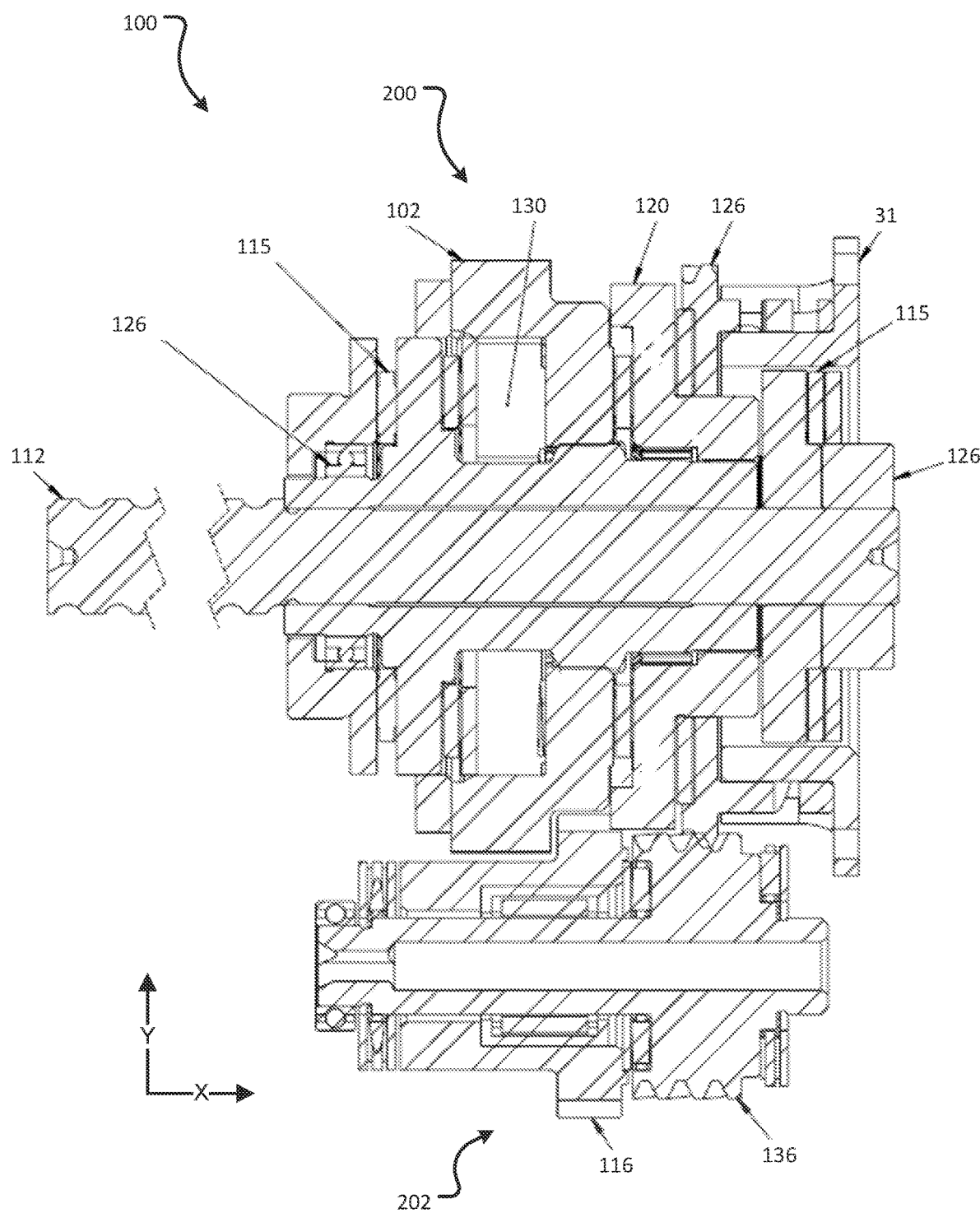
FIG. 2B illustrates a cross-sectional view of the redundant load transmission according to FIG. 2A.

FIG. 2B illustrates a cross-sectional view of the redundant load transmission according to FIG. 2A.

The redundant load transmission 100 may include a primary drive system 200. In aspects, the primary drive system 200 may include the primary coupling 102 that is driven by the input shaft 104 of the primary drive 150. The primary coupling 102 may have a gear or other means of being driven as well as a spline or other means to couple the primary coupling 102 to the output shaft 112.

In particular, the primary coupling 102 may have gear teeth on an outer diameter thereof as illustrated in FIG. 2A. The gear teeth of the primary coupling 102 may engage gear teeth on the input shaft 104. Additionally, the primary coupling 102 may include splines on an inner diameter thereof. The splines of the primary coupling 102 may engage corresponding splines on the output shaft 112.

The output shaft 112 can be captive and may use bearings 126 or other means to provide axial support. The output shaft 112 may utilize thrust bearings 115 to provide a means to transfer tension and compression loads to a grounded member, such as a housing. The thrust bearings 115 may also be used to isolate rotation in a primary load path, such that only intended members of the redundant load transmission 100 may be allowed to rotate. The primary drive system 200 may include springs or other means between the output shaft 112 and the primary coupling 102 to apply force to maintain a position aligning the input shaft 104, the primary coupling 102, and the output shaft 112.

The redundant load transmission 100 includes an emergency drive system 202. The emergency drive system 202 may include a secondary drive coupling 120 that is driven by the secondary drive 152 and a secondary shaft 116. The secondary drive coupling 120 may have a gear or other means of being driven as well as a spline or other means to couple the secondary drive coupling 120 to the output shaft 112.

In particular, the secondary drive coupling 120 may have gear teeth on an outer diameter thereof. The gear teeth of the secondary drive coupling 120 may engage gear teeth on the input shaft 136. Additionally, the secondary drive coupling 120 may include splines on an inner diameter thereof. The splines of the secondary drive coupling 120 may engage corresponding splines on the output shaft 112.

The secondary drive coupling 120 may be kept in a stowed position unless acted upon by the secondary drive 152. When commanded, the secondary drive 152 rotates the secondary shaft 116 and in turn rotates the secondary drive coupling 120.

The transition from the primary drive 150 to the secondary drive 152 may include a transition mechanism 31, which when commanded utilizes a transition coupling 118 that may include helical gears or other means and/or a linear drive mechanism in order to translate the secondary drive 152 onto the output shaft 112 and move the primary drive system 200 out of engagement with the output shaft 112.

When the transition from the primary drive 150 to the secondary drive 152 happens, the secondary drive coupling 120 is driven to actuate and may compress one or more springs 130. In aspects, the one or more springs 130 may be arranged between the output shaft 112 and the primary coupling 102. During the transition the primary coupling 102 may be driven off of a spline of the output shaft 112 or other means of coupling while the secondary drive coupling 120 transitions onto the output shaft 112. When the linear transition from the primary drive 150 to the secondary 152 has been completed, the redundant load transmission 100 may start to transmit torque to the output shaft 112.

Figure 3:
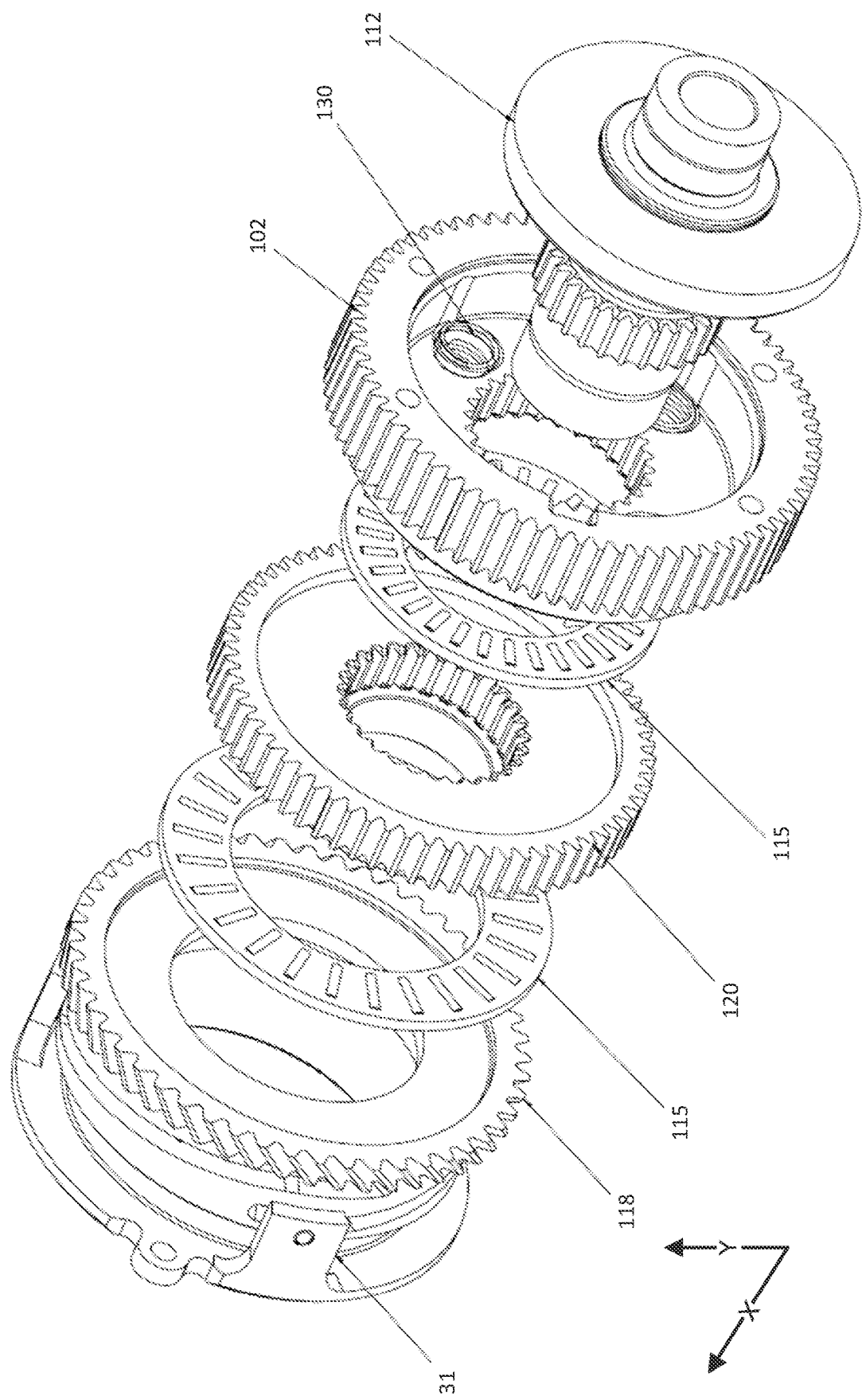
FIG. 3 illustrates an exploded view of a portion of a redundant load transmission according to an aspect of the disclosure.

FIG. 3 illustrates an exploded view of a portion of a redundant load transmission according to an aspect of the disclosure.

In particular, FIG. 3 illustrates components to provide implementation for the secondary drive 152 to transition from the primary drive 150. The transition mechanism 31 may include a grounded housing, the transition coupling 118, which may have gear teeth or other means to allow the transition coupling 118 to be driven, and the secondary drive coupling 120. When commanded, the transition coupling 118 may be driven by the input shaft 136 which may be implemented as a transition shaft, which as illustrated may rotate as well as translate the assembly in the direction of the primary drive system 200. The linear motion of the transition coupling 118 may move the secondary drive coupling 120, which in this example is sandwiched by the thrust bearings 115 on both sides, the primary coupling 102 off the spline or equivalent connecting structure of the output shaft 112, compressing the springs 130, as the secondary drive coupling 120 transitions onto a spline of the output shaft 112. The thrust bearings 115 in this example may ensure that only the linear motion is the only force acting to transition from the primary drive 150 to the secondary drive 152.

The redundant load transmission 100 may implement a controller. In one aspect, the redundant load transmission 100 may be implemented as an emergency controller. The emergency controller may be implemented by hardware as described herein. In this aspect, the redundant load transmission 100 may be activated by applying power to the emergency controller. In one aspect, the redundant load transmission may be configured to operate in a normal mode and further configured to implement health monitoring. The health monitoring may be implemented by hardware as described herein. The controller may include a processor configured to execute instructions stored on computer readable medium.

In a particular aspect, the controller may be configured to control operation of the primary drive 150, the secondary drive 152, and the redundant load transmission 100 during the primary configuration operation and/or the secondary configuration operation. In particular, the controller may control operation of the redundant load transmission 100 to change from the primary configuration to the secondary configuration.

In one aspect, the processor implements the process described below. The instructions may include various commands to control components of the redundant load transmission 100. The computer readable medium may be any type of memory known in the art including a non-volatile memory, such as magnetic fixed disk storage, cloud-based memory, flash memory or the like. The processor may also be in communication with other types of memory including random access memory and read-only memory. The controller may also include a display that may show various states and indications associated with instructions executed by the processor. For example, the display may display a failure of the primary drive 150 and implementation of the secondary configuration.

The controller may be in communication with a plurality of input devices and output devices. The plurality of input devices may include user interface devices such as keyboard, mouse, or other peripheral devices to receive a user input. The user input may include initiation of the secondary configuration.

The plurality of input devices may also include sensors in communication with various components of the redundant load transmission 100, such as motion sensors, speed sensors, voltage sensors, current sensor, or other detection devices known in the art. In particular, the sensors may include sensors to determine failure of the primary drive 150.

The plurality of output devices may include various electrical and/or mechanical control devices that may be used to control various components of the redundant load transmission 100, such as switches, electrical and/or electromagnetic relays, actuators, or other components known in the art. In particular, the output devices may control the redundant transmission to switch from the primary configuration to the secondary configuration.

The controller may receive signals from the primary drive system 200 and/or the primary drive 150 to sense the operation of the components associated with the primary drive system 200. The controller may also receive signals from the redundant load transmission 100 to sense the operation of the redundant load transmission 100, in particular the input shaft 104 and/or output shaft 112. For example, the redundant load transmission 100 may be able to detect motion of the input shaft 104 and/or output shaft 112 through a sensor such as a Hall effect sensor, or the like. In other aspects, a sensor may be used to detect the motion of the input shaft 104 and/or output shaft 112. In other aspects, a sensor may be used to detect failure of the primary drive 150.

The controller may determine whether the primary drive system 200 and/or redundant load transmission 100 is operating properly. If the controller does not sense any problems with either the primary drive system 200, the primary drive 150, and/or the redundant load transmission 100, the primary drive system 200 may continue to provide torque to the input shaft 104. The controller may continue to receive signals from the primary drive system 200 concerning the operation of the redundant load transmission 100.

In some circumstances, the controller may detect a problem in the operation of the primary drive system 200, the primary drive 150, and/or redundant load transmission 100. For example, a failure within the primary drive system 200 or the primary drive 150 may cause the redundant load transmission 100 to seize or remain static. As a result, the input shaft 104 and/or output shaft 112 may lock and not function properly. When a failure has been detected, the controller operatively coupled to the redundant load transmission 100 may send a signal to the secondary drive 152 to initiate the secondary drive mode.

The controller may signal failure of the primary drive system 200 to a flight warning system. For example, a warning message that the secondary drive system 116 has been engaged may be sent to a pilot. The pilot may be notified via the display or another output device in communication with the controller. The controller may provide additional diagnostic information related to the failure to the user based on information received from the various input devices. For example, the controller may notify the user of the type of failure that caused the switch to the secondary drive mode.

Accordingly, the actuator system 101 described is configured to implement a redundant system in order to overcome mechanical failures and increase safety and limit equipment damage. In particular, the actuator system 101 may determine a failure in the primary drive 150, disconnect the primary drive 150 from the redundant load transmission 100, and implement a secondary drive 152 in order to actuate the actuator 154.

The following are a number of nonlimiting EXAMPLES of aspects of the disclosure. The following are a number of nonlimiting EXAMPLES of aspects of the disclosure. One EXAMPLE includes: EXAMPLE 1. A redundant load transmission includes: an input shaft configured to receive a rotational torque from a primary drive; an output shaft configured to transmit the rotational torque to an actuator; a coupling assembly configured to connect the input shaft to the output shaft to transmit the rotational torque; the input shaft configured to receive the rotational torque from the primary drive and transmit the rotational torque through the coupling assembly when the coupling assembly is in a primary drive configuration; and the coupling assembly being configured to be disconnected from the input shaft and transmit a rotational torque to the output shaft from a secondary drive when the coupling assembly is in a secondary drive configuration.

The above-noted EXAMPLE may further include any one or a combination of more than one of the following EXAMPLES: 2. The redundant load transmission of any EXAMPLE herein, where the coupling assembly includes a secondary drive coupling that is configured to be driven by the secondary drive and a secondary shaft. 3. The redundant load transmission of any EXAMPLE herein, where the coupling assembly is configured to disengage from the input shaft by translating the coupling assembly along the output shaft away from the input shaft. 4. The redundant load transmission of any EXAMPLE herein, where the coupling assembly is configured to translate away from the input shaft when the redundant load transmission changes from the primary drive configuration to the secondary drive configuration. 5. The redundant load transmission of any EXAMPLE herein, where the secondary drive is configured to rotate the secondary shaft and in turn rotates the secondary drive coupling. 6. The redundant load transmission of any EXAMPLE herein, where the coupling assembly is configured to disengage from the input shaft by translating the coupling assembly along the output shaft away from the input shaft. 7. The redundant load transmission of any EXAMPLE herein, where the coupling assembly is configured to translate away from the input shaft when the redundant load transmission changes from the primary drive configuration to the secondary drive configuration. 8. The redundant load transmission of any EXAMPLE herein, where the coupling assembly is configured to disengage from the input shaft by translating the coupling assembly along the output shaft away from the input shaft. 9. The redundant load transmission of any EXAMPLE herein, where the coupling assembly is configured to translate away from the input shaft when the redundant load transmission changes from the primary drive configuration to the secondary drive configuration. 10. The redundant load transmission of any EXAMPLE herein, where the coupling assembly is configured to disengage from the input shaft by translating the coupling assembly along the output shaft away from the input shaft; and where the coupling assembly is configured to translate away from the input shaft when the redundant load transmission changes from the primary drive configuration to the secondary drive configuration. 11. A landing gear system includes the redundant load transmission of any EXAMPLE herein, where the actuator includes a landing gear actuator configured to extend and retract landing gear.

One EXAMPLE includes: EXAMPLE 1. A redundant load transmission includes: an input shaft configured to receive a rotational torque from a primary drive; an output shaft configured to transmit the rotational torque to an actuator; a coupling assembly configured to connect the input shaft to the output shaft to transmit the rotational torque; the input shaft configured to receive the rotational torque from the primary drive and transmit the rotational torque through the coupling assembly when the coupling assembly is in a primary drive configuration; and the coupling assembly being configured to be disconnected from the input shaft and transmit a rotational torque to the output shaft from a secondary drive when the coupling assembly is in a secondary drive configuration.

The above-noted EXAMPLE may further include any one or a combination of more than one of the following EXAMPLES: 2. The redundant load transmission of any EXAMPLE herein, where the coupling assembly is configured to disengage from the input shaft by translating the coupling assembly along the output shaft away from the input shaft. 3. The redundant load transmission of any EXAMPLE herein, where the coupling assembly includes an inner coupling portion and an outer coupling portion; where the outer coupling portion includes a helical geared surface; and where the helical geared surface is configured to be engaged by a drive gear and translated by rotation of the drive gear to disengage the coupling assembly from the input shaft in the secondary drive configuration. 4. The redundant load transmission of any EXAMPLE herein, where the drive gear is configured to be rotated by the secondary drive. 5. The redundant load transmission of any EXAMPLE herein, where the outer coupling portion is configured to receive the inner coupling portion. 6. The redundant load transmission of any EXAMPLE herein, where the coupling assembly is configured to translate away from the input shaft when the redundant load transmission changes from the primary drive configuration to the secondary drive configuration. 7. The redundant load transmission of any EXAMPLE herein, includes a spring arranged around the output shaft, where the coupling assembly is further configured to compress the spring when the redundant load transmission changes from the primary drive configuration to the secondary drive configuration. 8. The redundant load transmission of any EXAMPLE herein, where the coupling assembly further includes a bearing, where the bearing is configured to compress the spring when the redundant load transmission changes from the primary drive configuration to the secondary drive configuration. 9. The redundant load transmission of any EXAMPLE herein, where the input shaft includes input shaft splines; where the coupling assembly includes inner coupling splines configured to engage the input shaft splines of the input shaft; and where the output shaft includes output shaft splines configured to engage the inner coupling splines of the coupling assembly. 10. The redundant load transmission of any EXAMPLE herein, where the coupling assembly is configured to disengage the inner coupling splines from the input shaft splines of the input shaft by translating the coupling assembly along the output shaft away from the input shaft. 11. The redundant load transmission of any EXAMPLE herein, where the coupling assembly includes an inner coupling portion and an outer coupling portion; where the outer coupling portion includes a helical geared surface; and where the helical geared surface is configured to be engaged by a drive gear and translated by rotation of the drive gear to disengage the inner coupling splines of the coupling assembly from the input shaft splines of the input shaft in the secondary drive configuration. 12. The redundant load transmission of any EXAMPLE herein, where the coupling assembly includes an inner coupling portion and an outer coupling portion; and where the outer coupling portion is configured to engage the inner coupling portion in the secondary drive configuration to disengage from the input shaft by translating the coupling assembly along the output shaft away from the input shaft. 13. The redundant load transmission of any EXAMPLE herein, where the coupling assembly includes an inner coupling portion and an outer coupling portion; where the outer coupling portion includes teeth; where the inner coupling portion includes teeth; and where the outer coupling portion is configured to engage the teeth of the inner coupling portion in the secondary drive configuration to disengage the coupling assembly from the input shaft by translating the coupling assembly along the output shaft away from the input shaft. 14. The redundant load transmission of any EXAMPLE herein, includes: a controller in electrical communication with the primary drive and the secondary drive; and a sensor configured to send a signal to the controller when the primary drive configuration has failed. 15. The redundant load transmission of any EXAMPLE herein, where the controller is configured to switch the redundant load transmission from the primary drive configuration to the secondary drive configuration in response to receiving the signal from the sensor. 16. A landing gear system includes the redundant load transmission of any EXAMPLE herein, where the actuator includes a landing gear actuator configured to extend and retract landing gear.

One EXAMPLE includes: EXAMPLE 17. A redundant load transmission includes: an input shaft configured to receive a rotational torque from a primary drive; an output shaft configured to transmit the rotational torque to an actuator; a coupling assembly configured to connect the input shaft to the output shaft to transmit the rotational torque; the input shaft configured to receive the rotational torque from the primary drive and transmit the rotational torque through the coupling assembly when the coupling assembly is in a primary drive configuration; the coupling assembly being configured to be disconnected from the input shaft and transmit a rotational torque to the output shaft from a secondary drive when the coupling assembly is in a secondary drive configuration; a controller in electrical communication with the primary drive and the secondary drive; and a sensor configured to send a signal to the controller when the primary drive configuration has failed.

The above-noted EXAMPLE may further include any one or a combination of more than one of the following EXAMPLES: 18. The redundant load transmission of any EXAMPLE herein, where the input shaft includes input shaft splines; where the coupling assembly includes inner coupling splines configured to engage the input shaft splines of the input shaft; and where the output shaft includes output shaft splines configured to engage the inner coupling splines of the coupling assembly. 19. The redundant load transmission of any EXAMPLE herein, where the coupling assembly is configured to disengage the inner coupling splines from the input shaft splines of the input shaft by translating the coupling assembly along the output shaft away from the input shaft. 20. The redundant load transmission of any EXAMPLE herein, where the coupling assembly includes an inner coupling portion and an outer coupling portion; where the outer coupling portion includes a helical geared surface; and where the helical geared surface is configured to be engaged by a drive gear and translated by rotation of the drive gear to disengage the inner coupling splines of the coupling assembly from the input shaft splines of the input shaft in the secondary drive configuration.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A redundant load transmission comprising:
   an input shaft configured to receive a rotational torque from a primary drive;
   an output shaft configured to transmit the rotational torque to an actuator;

a coupling assembly configured to connect the input shaft to the output shaft to transmit the rotational torque;

the input shaft configured to receive the rotational torque from the primary drive and transmit the rotational torque through the coupling assembly when the coupling assembly is in a primary drive configuration; and the coupling assembly being configured to be disconnected from the input shaft and transmit a rotational torque to the output shaft from a secondary drive when the coupling assembly is in a secondary drive configuration, wherein the coupling assembly is configured to disengage from the input shaft by translating the coupling assembly along the output shaft away from the input shaft.

2. The redundant load transmission of claim 1, wherein the coupling assembly comprises a secondary drive coupling that is configured to be driven by the secondary drive and a secondary shaft.

3. The redundant load transmission of claim 2, wherein the coupling assembly is configured to translate away from the input shaft when the redundant load transmission changes from the primary drive configuration to the secondary drive configuration.

4. The redundant load transmission of claim 2, wherein the secondary drive is configured to rotate the secondary shaft and in turn rotates the secondary drive coupling.

5. The redundant load transmission of claim 4, wherein the coupling assembly is configured to translate away from the input shaft when the redundant load transmission changes from the primary drive configuration to the secondary drive configuration.

6. The redundant load transmission of claim 1, wherein the coupling assembly is configured to translate away from the input shaft when the redundant load transmission changes from the primary drive configuration to the secondary drive configuration.

7. The redundant load transmission of claim 1, wherein the coupling assembly is configured to translate away from the input shaft when the redundant load transmission changes from the primary drive configuration to the secondary drive configuration.

8. A landing gear system comprising the redundant load transmission of claim 1, wherein the actuator comprises a landing gear actuator configured to extend and retract landing gear.

9. The redundant load transmission of claim 2, wherein the coupling assembly is configured to translate away from the input shaft when the redundant load transmission changes from the primary drive configuration to the secondary drive configuration; and wherein the secondary drive is configured to rotate the secondary shaft and in turn rotates the secondary drive coupling.

10. The redundant load transmission of claim 9, wherein the coupling assembly is configured to translate away from the input shaft when the redundant load transmission changes from the primary drive configuration to the secondary drive configuration.

11. A landing gear system comprising the redundant load transmission of claim 2, wherein the actuator comprises a landing gear actuator configured to extend and retract landing gear.

12. A landing gear system comprising the redundant load transmission of claim 3, wherein the actuator comprises a landing gear actuator configured to extend and retract landing gear.

13. A landing gear system comprising the redundant load transmission of claim 4, wherein the actuator comprises a landing gear actuator configured to extend and retract landing gear.

14. A landing gear system comprising the redundant load transmission of claim 5, wherein the actuator comprises a landing gear actuator configured to extend and retract landing gear.

15. A landing gear system comprising the redundant load transmission of claim 6, wherein the actuator comprises a landing gear actuator configured to extend and retract landing gear.

16. A landing gear system comprising the redundant load transmission of claim 7, wherein the actuator comprises a landing gear actuator configured to extend and retract landing gear.

17. A landing gear system comprising the redundant load transmission of claim 9, wherein the actuator comprises a landing gear actuator configured to extend and retract landing gear.

\* \* \* \* \*